US009756522B2

United States Patent
Kotecha et al.

(10) Patent No.: US 9,756,522 B2
(45) Date of Patent: Sep. 5, 2017

(54) SESSION ASSIGNMENT AND BALANCING

(71) Applicant: Verizon Patent and Licensing Inc., Arlington, VA (US)

(72) Inventors: Lalit R. Kotecha, San Ramon, CA (US); Matthew W. Nelson, Pleasanton, CA (US); Sagiv Draznin, Walnut Creek, CA (US); Zohar Fuchs, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 14/177,128

(22) Filed: Feb. 10, 2014

(65) Prior Publication Data

US 2015/0230123 A1    Aug. 13, 2015

(51) Int. Cl.
*H04W 28/02* (2009.01)
*H04W 48/06* (2009.01)
*H04W 48/00* (2009.01)
*H04L 29/08* (2006.01)

(52) U.S. Cl.
CPC ..... *H04W 28/0247* (2013.01); *H04L 67/1002* (2013.01); *H04W 28/0289* (2013.01); *H04W 48/06* (2013.01); *H04W 48/17* (2013.01)

(58) Field of Classification Search
CPC .......................... H04W 28/0247; H04W 48/06

USPC .................................................. 370/228, 235
See application file for complete search history.

(56) References Cited

U.S. PATENT DOCUMENTS

| 8,200,830 | B2* | 6/2012 | Ramankutty | H04W 24/08 709/206 |
|---|---|---|---|---|
| 2009/0116440 | A1* | 5/2009 | Zhao et al. | 370/329 |
| 2009/0161575 | A1* | 6/2009 | Zhao et al. | 370/254 |
| 2009/0245177 | A1* | 10/2009 | Zhao et al. | 370/328 |
| 2009/0262736 | A1* | 10/2009 | Zhao et al. | 370/389 |
| 2010/0272115 | A1* | 10/2010 | Ramankutty | H04W 76/041 370/401 |
| 2010/0281157 | A1* | 11/2010 | Ramankutty | H04W 24/08 709/224 |
| 2012/0250509 | A1* | 10/2012 | Leung et al. | 370/235 |
| 2013/0135990 | A1* | 5/2013 | Draznin | 370/221 |
| 2014/0003233 | A1* | 1/2014 | Rune et al. | 370/230 |
| 2015/0139096 | A1* | 5/2015 | Morioka | H04W 28/08 370/329 |
| 2015/0189563 | A1* | 7/2015 | Chan | H04W 36/08 370/331 |

* cited by examiner

*Primary Examiner* — Chi H Pham
*Assistant Examiner* — Robert Lopata

(57) ABSTRACT

A server device may determine session information that identifies a quantity of sessions established between each of one or more serving gateways (SGWs) and a packet data network (PDN) gateway (PGW); and direct a mobility management entity (MME) to assign additional sessions between the one or more SGWs and the PGW based on the session information.

20 Claims, 8 Drawing Sheets

Selected Session Information
320

| SGW IP | # of Sessions | Location |
|---|---|---|
| 1.1.1.1 | 700 | Location 1 |
| 1.1.1.5 | 500 | Location 2 |
| 1.1.1.8 | 300 | Location 5 |

Balancing Rules
330

| SGW Attributes | Rule |
|---|---|
| Location = Location 1 | Load Factor = 4<br>Max Sessions = 500 |
| IP Address = 1.1.1.2 | Load factor = 5<br>Max Sessions = 600 |
| IP Address = 1.1.1.5 | Load factor = 8<br>Max Sessions = 700 |
| IP Address = 1.1.1.18 | Load factor = 3<br>Max Sessions = 400 |

SGW Topology Information
310

| SGW ID | SGW IP | SGW Location |
|---|---|---|
| SGW-1 | 1.1.1.1 | Location 1 |
| SGW-2 | 1.1.1.2 | Location 1 |
| SGW-3 | 1.1.1.3 | Location 1 |
| SGW-4 | 1.1.1.4 | Location 2 |
| SGW-5 | 1.1.1.5 | Location 2 |
| SGW-6 | 1.1.1.6 | Location 3 |
| SGW-7 | 1.1.1.7 | Location 4 |
| SGW-8 | 1.1.1.8 | Location 5 |
| ••• | | |
| SGW-R | SGW-R IP | Location Y |

Fig. 3

SESSION ASSIGNMENT AND BALANCING

BACKGROUND

User devices may communicate over a network (e.g., a cellular network) to transmit and/or receive data flows via sessions established by network devices connected within the cellular network. A packet data network (PDN) gateway (PGW) may be paired to multiple serving gateways (SGWs), and may receive data flows for transmission via sessions established by the multiple SGWs. Each of the multiple SGWs may be selected to establish sessions using a round-robin technique or some other technique. Since the duration of sessions may vary, some SGWs may become overloaded, while other SGWs may have available capacity to handle traffic.

BRIEF DESCRIPTION OF THE DRAWINGS

FIG. 3 illustrates example data structures that may store network topology information, session information for selected network devices, and balancing rules;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may assign sessions between a packet data network (PDN) gateway (PGW) and particular serving gateways (SGWs) in a network (e.g., a cellular network), based on session information and/or balancing rules. As a result, sessions may be balanced across the SGWs to prevent particular SGWs from becoming overloaded while other SGWs may have capacity to process traffic.

Figure 1:
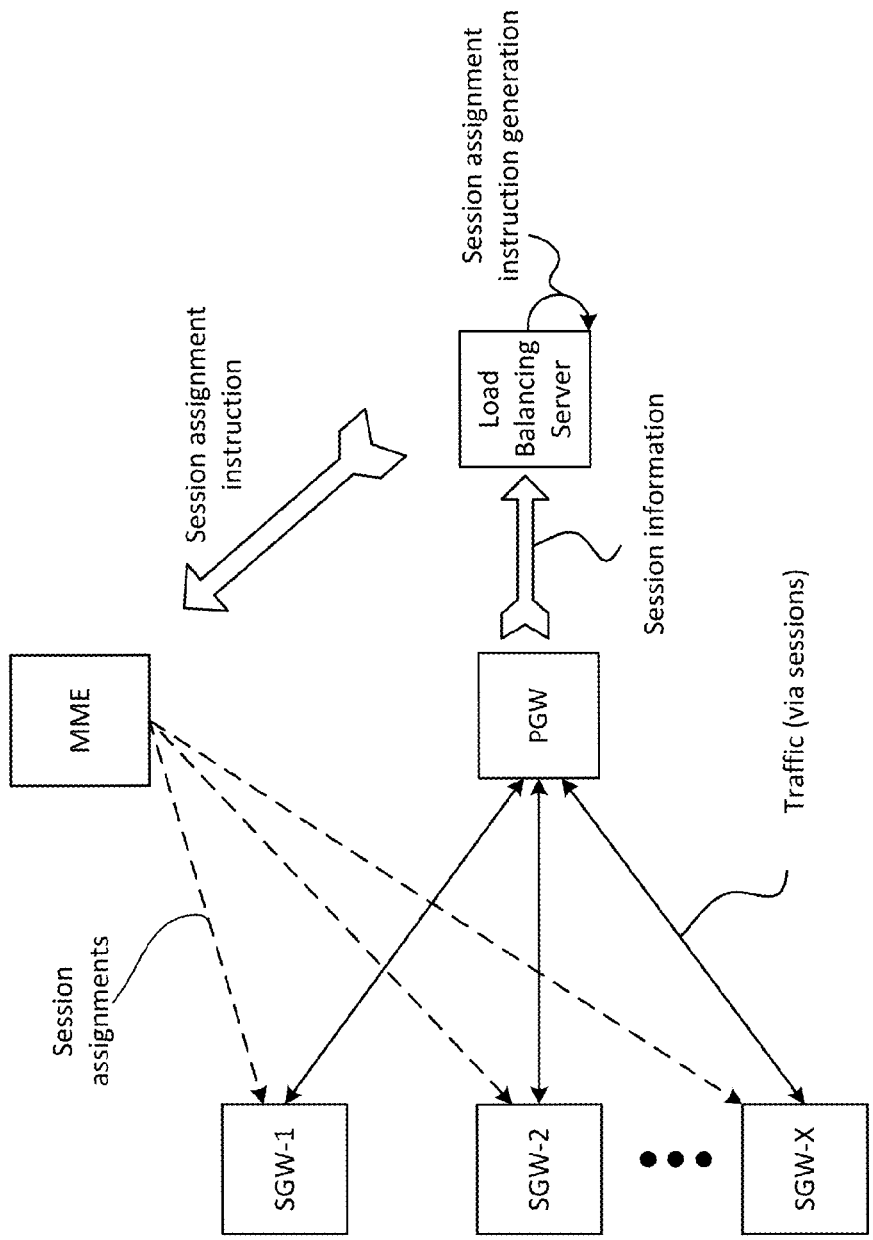
FIG. 1 illustrates an example overview of an implementation described herein.

FIG. 1 illustrates an example overview of an implementation described herein. As shown in FIG. 1 a PGW may connect with multiple SGWs (e.g., SGW-1 through SGW-X, where X is an integer greater than or equal to 1). The SGWs may transmit traffic to and/or from the PGW via sessions established between the SGWs and the PGW. The PGW may determine session information (e.g., information identifying a number of sessions established between each SGW and the PGW), and may provide the session information, to a load balancing server. Each session may be established to transmit traffic to and/or from user devices via the SGW and the PGW.

Based on receiving the session information, the load balancing server may instruct a mobility management entity device (MME) to assign or prevent the assignment of sessions to particular SGWs (shown in FIG. 1 as "session assignment instruction"). In some implementations, the session assignment instruction may be generated based on balancing rules that may be used to balance sessions across particular SGWs. For example, a balancing rule may identify a balancing factor and/or a quantity of maximum sessions for a particular SGW. Based on the balancing factors of multiple SGWs, the load balancing server may identify a proportion at which sessions are to be balanced across the multiple SGWs. As a result, sessions may be assigned to the SGWs based on the session information and/or the balancing rules. Further, sessions may be balanced across the SGWs balance sessions from overloaded SGWs to SGWs with available resources (e.g., network and/or processing resources).

Figure 2:
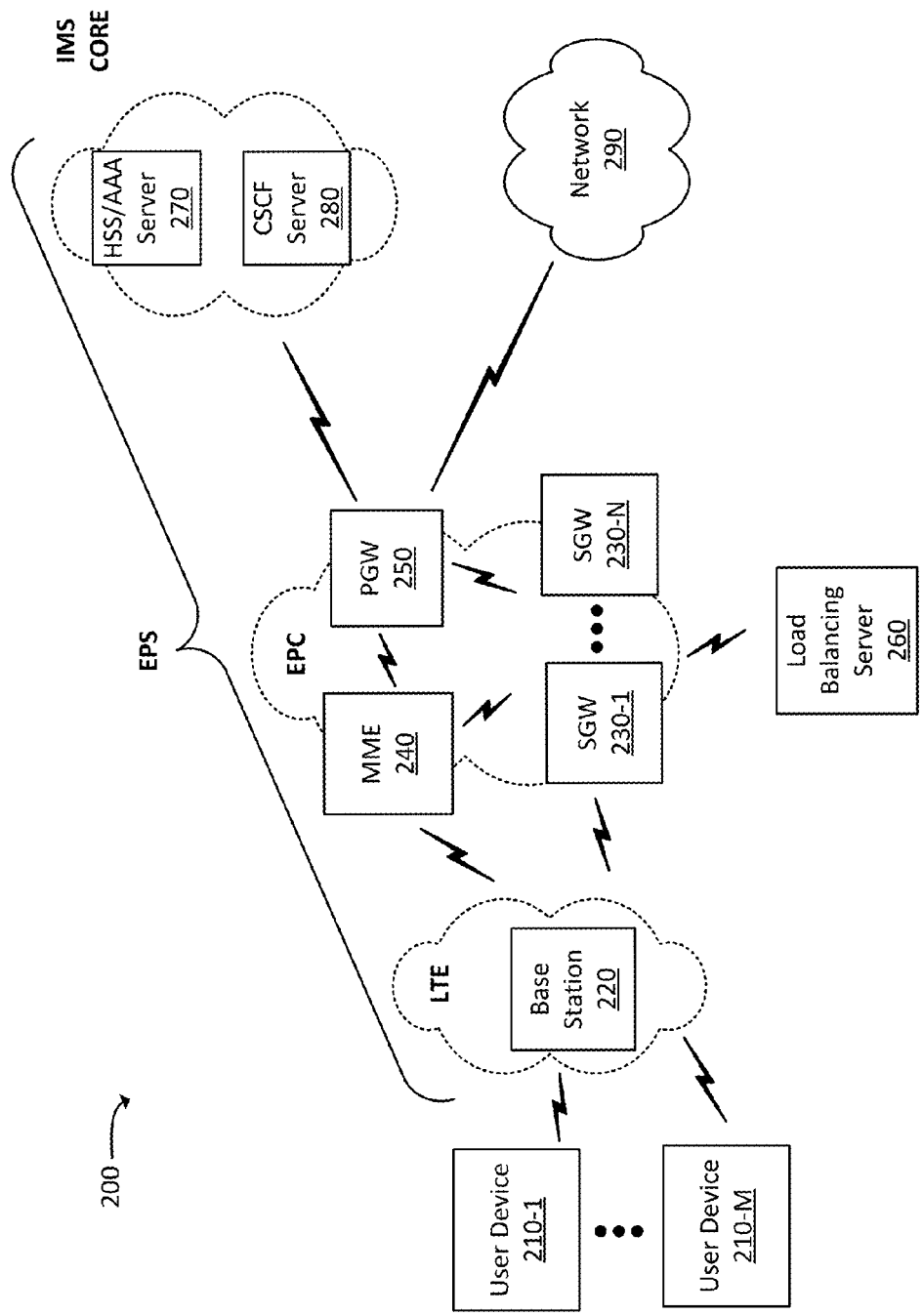
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (sometimes referred to individually as "user device 210" or collectively as "user devices 210," and where M is an integer greater than or equal to 1), base station 220, SGWs 230-1 through 230-N (sometimes referred to individually as "SGW 230" or collectively as "SGWs 230," and where N is an integer greater than or equal to 1), MME 240, PGW 250, load balancing server 260, home subscriber server (HSS)/authentication, authorization, accounting (AAA) server 270 (referred to as "HSS/AAA server 270"), call service control function (CSCF) server 280 (referred to as "CSCF server 280"), and network 290.

Environment 200 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 and may enable user device 210 to communicate with network 290 and/or the IMS core. The IMS core may include HSS/AAA server 260 and/or CSCF server 270. The IMS core may manage authentication, connection initiation, account information, a user profile, etc. associated with user device 210. As shown in FIG. 2, the LTE network may include base station 220, and the EPC may include SGW 230, MME 240, and/or PGW 250.

User device 210 may include a computation or communication device, such as a wireless mobile communication device that is capable of communicating with base station 220 and/or a network (e.g., network 290). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 290 via base station 220, one or more SGWs 230, and PGW 250.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 290 via one or more SGWs 230 and PGW 250. Base station 220 may send traffic to and/or receive traffic from user device 210 via an air interface. One or more of base stations 220 may be associated with a RAN, such as the LTE network.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 250. In one example implementation, SGW 230 may route and forward user data packets, may act as a mobility anchor for a user plane during inter-eNB handovers, and may act as an anchor for mobility between LTE and other 3GPP technologies. SGW 230 may provide session information to PGW 250.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260). MME 240 may assign sessions to one or more SGWs 230 based on instructions received from load balancing server 260. Each session, assigned by MME 240, may be established between SGW 230 and PGW 250 to transmit traffic to and/or from user devices via SGW 230 and PGW 250. In some implementations, MME 240 may assign sessions using a General Packet Radio Service (GPRS) Tunneling Protocol-Control (GTP-C) instruction.

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

Load balancing server 260 may include a server device, or a collection of server devices. In some implementations, load balancing server 260 may receive session information identifying a number of sessions established between SGWs 230 and PGW 250. Load balancing server 260 may instruct MME 240 to assign or prevent the assignment of sessions to particular SGWs 230 based on the session information. For example, load balancing server 260 may instruct MME 240 to assign or prevent the assignment of sessions to particular SGWs 230 in order to balance sessions across SGWs 230. Load balancing server 260 may further receive balancing rules (e.g., from an operator of load balancing server 260) and may instruct MME 230 to assign or prevent the assignment of sessions to particular SGWs 230 further based on the balancing rules. In some implementations, load balancing server 260 may implemented as part of PGW 250 (e.g., as software running on PGW 250). Alternatively, load balancing server 260 may be implemented externally to PGW 250 (e.g., as a device separate from PGW 250).

HSS/AAA server 270 may include one or more computing devices, such as a server device or a collection of server devices. In some implementations, HSS/AAA server 270 may include a device that gathers, processes, searches, stores, and/or provides information in a manner described herein. For example, HSS/AAA server 270 may manage, update, and/or store, in a memory associated with HSS/AAA server 270, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 270 may include a device that performs authentication, authorization, and/or accounting operations associated with a communication connection with one or more user devices 210.

CSCF server 280 may include one or more computing devices, such as a server device or a collection of server devices, that gather, process, search, store, and/or provide information. CSCF server 280 may process and/or route calls to and from user device 210 via the EPC. For example, CSCF server 280 may process calls, received from network 290, that are destined for user device 210. In another example, CSCF server 280 may process calls, received from user device 210, that are destined for network 290.

Network 290 may include one or more wired and/or wireless networks. For example, network 290 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 290 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates example data structures 310-330 that may store network topology information, session information for selected network devices, and balancing rules, respectively. In some implementations, data structures 310-330 may be stored in a memory of load balancing server 260. In some implementations, data structures 310-330 may be stored in a memory separate from, but accessible by, load balancing server 260 (e.g., a "cloud" storage device). In some implementations, data structures 310-330 may be stored by some other device in environment 200, such as SGW 230, MME 240, and/or PGW 250. In some implementations, a particular instance of data structure 310, 320, or 330 may contain different information and/or fields than another instance of data structure 310, 320, or 330, respectively.

Data structure 310 may store topology information for SGWs 230 associated with a particular PGW 250. Each entry in data structure 310 may include information identifying a particular SGW 230. For example, each entry may identify an identifier (ID) of a particular SGW 230, an IP address of the particular SGW 230, a physical location of the particular SGW 230, and/or some other information regarding the particular SGW 230. In some implementations, information stored by data structure 310 may be presented to an operator of load balancing server 260. In some implementations, the operator may select particular SGWs 230, identified in data structure 310, across which to balance sessions. For example, the operator may select to balance sessions across SGWs associated with a particular geographical location. Additionally, or alternatively, the operator may select to balance sessions to alleviate particular overloaded SGWs 230.

In some implementations, the particular SGWs 230, across which to balance sessions, may be selected independent of interaction with an operator or other user. For example, the particular SGWs 230 may be selected based on a measure of network load for each SGW 230. Additionally, or alternatively, SGWs 230 may be selected based on some other factor.

Data structure 320 may store session information for selected SGWs 230 (e.g., SGWs 230 selected by the operator, or selected independently of the operator, as described above). For example, each entry in data structure 320 may store an IP address of a particular selected SGW 230, a number of sessions between the particular selected SGW 230 and a corresponding PGW 250, a location of the particular selected SGW 230, and/or some other session-related information regarding the particular selected SGW 230 (e.g., network load, data rates, etc.).

Data structure 330 may store balancing rules for SGWs 230 having particular attributes. For example, each entry in data structure 330 may identify attributes of SGWs 230, (e.g., location, IP address, SGW ID, and/or other attributes) and balancing rules (e.g., rules relating to a load factor, a maximum number of sessions, and/or some other balancing rule) that correspond to the attributes. In the example shown in FIG. 3, data structure 330 may store information identifying that sessions for SGWs 230, associated with the location of "Location 1," are to be balanced based on a load factor of 4 and a maximum of 500 sessions.

In some implementations, the load factor may include a value on a scale (e.g., a scale of 1-10). The load factor may identify a proportion in which sessions should be balanced across selected SGWs 230. As an example, assume that sessions are to be balanced across three selected SGWs 230 (e.g., SGW 230-1, SGW 230-2, and SGW 230-3). Further assume that the load factors are 4, 5, and 8, respectively. Given these assumptions, load balancing server 260 may determine an aggregate load score of 17 (e.g., 4+5+8). Further, load balancing server 260 may generate a session assignment instruction to direct MME 240 to balance sessions across SGWs 230-1, 230-2, and 230-3 in proportions of approximately 23.5%, 29.4%, and 47.1%, respectively (e.g., 4/17, 5/17, and 8/17). The session assignment instruction may further direct MME 240 to cap the number of sessions at a particular limit identified in data structure 330. In some implementations, information stored by data structure 330 may be selected by an operator of load balancing server 260.

Figure 4:
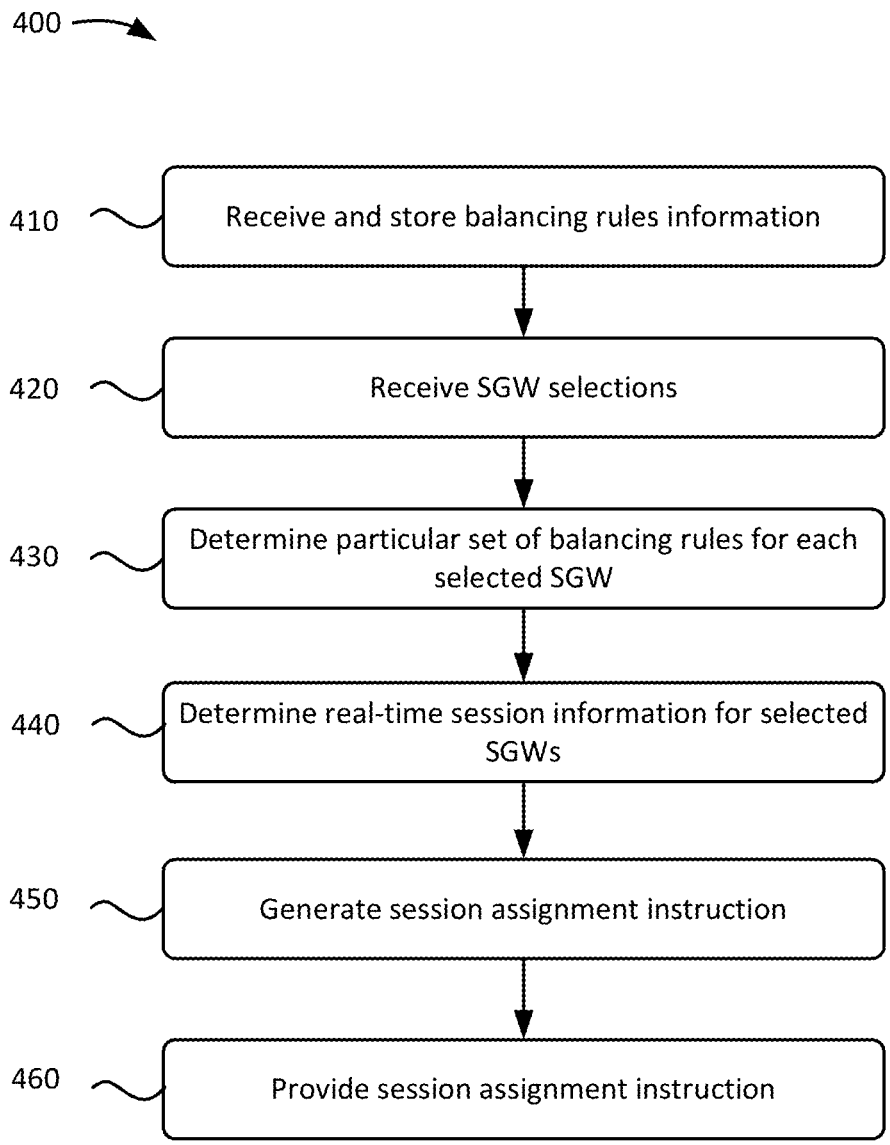
FIG. 4 illustrates a flowchart of an example process for assigning sessions to a set of SGWs.

FIG. 4 illustrates a flowchart of an example process 400 for assigning sessions to a set of SGWs 230. In some implementations, process 400 may be performed by one or more components of load balancing server 260. In some implementations, some or all of blocks of process 400 may be performed by one or more components of another device (e.g., SGW 230, MME 240, and/or PGW 250) in addition to, or in lieu of, load balancing server 260.

As shown in FIG. 4, process 400 may include receiving and storing balancing rules information (block 410). For example, load balancer server 260 may receive balancing rules information from an operator via a user interface and/or from another source, such as a device that automatically generates balancing rules based on network and/or processing capacity of SGWs 230. The balancing rules information may be stored in data structure 330 as described above. In some implementations, the balancing rules information may identify a load factor, a maximum number of sessions, and/or some other information that may be used to determine a manner in which sessions should be balanced across multiple SGWs 230. In some implementations, load balancer server 260 may receive multiple sets of balancing rules. Each set of balancing rules may apply to a particular SGW 230 or to a particular group of multiple SGWs 230.

For example, a first set of balancing rules may apply to a first set of SGWs 230 having a first set of attributes (e.g., SGWs associated with a particular location). The first set of balancing rules may identify a first load factor and a first maximum number of sessions value. A second set of balancing rules may apply to a second SGW 230 having a second set of attributes (e.g., an SGW 230 having a particular IP address). The second set of balancing rules may identify a second load factor and a second maximum number of sessions value. In some implementations, the balancing rules may identify a load capacity of SGW 230. For example, the load factor and the maximum number of sessions may be proportional to the load capacity of SGW 230.

In some implementations, the balancing rules may be assigned in a hierarchical manner. For example, two particular sets of balancing rules may be assigned to different priority levels. As an example, assume that both sets of balancing rules are applicable to a particular set of SGWS 230 (e.g., attributes of the set of SGWs 230 match a set of specified attributes associated with both sets of balancing rules). In this situation, the set of balancing rules with the higher priority may be applied to the set of SGWs 230, while the other set of balancing rules may be ignored, with respect to the set of SGWs 230. In some implementations, the set of balancing rules with the higher priority may be applied to the set of SGWs 230 prior to the application of the other set of balancing rules to the set of SGWs 230. In yet other implementations, multiple sets of balancing rules may be applied (e.g., in a non-hierarchical manner) to a particular set of SGWs 230.

Process 400 may also include receiving SGW selections (block 420). For example, load balancer server 260 may receive selections for SGWs 230 among which sessions should be balanced. In some implementations, load balancer server 260 may receive the selections from an operator of load balancer server 260 via a user interface. In some implementations, load balancer server 260 may present a list of SGWs 230 that the operator may select. Additionally, or alternatively, load balancer server 260 may receive the selections from another source. For example, load balancer server 260 may receive the selections from a device that automatically selects SGWs 230, and/or determines how to balance sessions among a set of SGWs 230 (e.g., based on based on a measure of network load for each SGW 230 and/or based on some other factor).

The selections may identify SGWs 230 based on attributes of SGWs 230, such as attributes described with respect to data structure 310 (e.g., location, IP address, identifier, etc.), and/or other identifying information. Additionally, or alternatively, the selections may identify SGWs 230 based on an amount of traffic transmitted by SGWs 230. For example, the operator may select to prioritize the balancing of sessions among SGWs 230 that may be considered to be of greater priority than other SGWs 230, and/or SGWs 230 that transmit at least a particular threshold amount of traffic.

Process 400 may further include determining a particular set of balancing rules for each selected SGW (block 430). For example, load balancer server 260 may determine the particular sets of balancing rules for each of the selected SGWs 230 based on attributes (e.g., location, IP address, etc.) of the selected SGWs 230. For example, load balancer server 260 may determine a first set of balancing rules for a first SGW 230 having a first set of attributes. Similarly, load balancer server 260 may determine a second set of balancing rules for a second SGW 230 having a second set of attributes.

Process 400 may also include determining real-time session information for selected SGWs (block 440). For example, load balancer server 260 may determine the real-time session information for the selected SGWs 230 by requesting the real-time session information from PGW 250. Additionally, or alternatively, load balancing server 260 may receive session information from another device that collects session information regarding SGWs 230. Additionally, or alternatively, PGW 250 may actively transmit session information, and load balancer server 260 may receive the session information from the selected SGWs 230. In some implementations, PGW 250 (and/or another device, such as a device that monitor traffic attributes of SGWs 230) may provide a corresponding ID, a number of sessions between SGW 230 and load balancer server 260, and/or some other session-related information (e.g., bandwidth load, bit rates of data flows, etc.). In some implementations, load balancer server 260 may store the real-time session information for the selected SGWs 230 in a data structure, such as data structure 320.

Process 400 may further include generating a session assignment instruction (block 450). For example, load balancer server 260 may generate the session assignment instruction based on the real-time session information and the balancing rules information. The session assignment instruction may be used to assign additional sessions to the selected SGWs 230 in a desired load-balancing manner, in accordance with some implementations. As an example, assume that load balancer server 260 receives selections of three SGWs 230 (e.g., SGW 230-1, SGW 230-2, and SGW 230-3). Further assume that load balancer server 260 receives information identifying load factors of 4, 5, and 8, respectively, for the selected SGWs 230 (e.g., as part of the received balancing rules information). Given these assumptions, load balancer server 260 may determine an aggregate load score of 17 (e.g., 4+5+8). Further, may determine that sessions should be balanced across SGWs 230-1, 230-2, and 230-3 in proportions of approximately 23.5%, 29.4%, and 47.1%, respectively (e.g., 4/17, 5/17, and 8/17).

Continuing with the above example, assume that the real-time session information identifies 400, 300, and 300, respectively, of real-time session established between PGW 250 and, respectively, SGW 230-1, SGW 230-2, and SGW 230-3 (e.g., an aggregate of 1000 total sessions). Given these assumptions, load balancer server 260 may determine a target number of sessions of approximately 235, 294, and 471 sessions for SGW 230-1, 230-2, and 230-3, respectively. Load balancer server 260 may generate a session assignment instruction to prevent MME 240 from assigning additional sessions to SGW 230-1 and 230-2 (e.g., since the number of real-time sessions exceed the number of target sessions). The session assignment instruction may further direct MME 240 to assign additional sessions to SGW 230-3 (e.g., since the number of real-time sessions are below the number of target sessions). In some implementations, the target number of sessions may correspond to a threshold number of sessions at which SGW 230 may be considered to be overloaded. In some implementations, load balancer server 260 may generate a session assignment instruction based on a default set of balancing rules if balancing rules for a particular SGW 230 have not been received.

Process 400 may also include providing the session assignment instruction (block 460). For example, load balancer server 260 may provide the session assignment instruction to MME 240. Based on receiving the session assignment instruction, MME 240 may assign additional sessions between SGW 230-1, 230-2, and 230-3 in accordance with the session assignment instruction. For example, MME 240 may direct SGW 230-1, 230-2, and 230-3 to establish sessions with PGW 250 to transmit traffic to and/or from user device 210. In some implementations, the session establishment instructions may correspond to GTP-C instructions and/or some other type of instruction or message.

In some implementations, MME 240 may provide a session establishment instruction to SGW 230-1, 230-2, or 230-3 when the number of real-time sessions drop below the number of target sessions. For example, such a situation may occur when sessions between a particular SGW 230 and PGW 250 expire. Also, sessions may drop as network activity of user device 210 enters an idle state (e.g., when the transmission of data flows to and/or form user device 210 via SGW 230 and PGW 250 become idle). In some implementations, the session establishment instructions may direct SGW 230 to establish a particular number of sessions with PGW 250 (e.g., a particular number of sessions up to a maximum number of sessions or a determined target number of sessions).

In some implementations, MME 240 may refrain from assigning sessions to SGWs 230-1, 230-2, and 230-3 when the number of real-time sessions, associated with SGWs 230-1, 230-2, and 230-3 exceed the number of target sessions. In some implementations, the session assignment instruction may further direct MME 240 to prevent the assignment of sessions when the number of real-time sessions exceed the maximum number of sessions value included in the balancing instructions. As a result, sessions may be assigned to selected SGWs 230, such that the selected SGWs 230 maintain a particular balance of sessions.

In some implementations, process blocks 430-450 may be repeated on an ongoing basis. For example, load balancer server 260 may monitor the real-time session information for the selected SGWs 230 and determine a target number of sessions for each SGW 230 (e.g., based on the balancing rules information and the real-time session information).

Load balancer server 260 may then generate updated assignment instructions that direct MME 240 to assign sessions to SGWs 230 whose real-time sessions are under the target number of sessions, and prevent the assignment of sessions to SGWs 230 whose real-time sessions are over the target number of sessions. Additionally, or alternatively, MME 240 may monitor a number of sessions for each SGW 230, and may assign sessions to SGWs 230 having available capacity to handle traffic.

Figure 5:
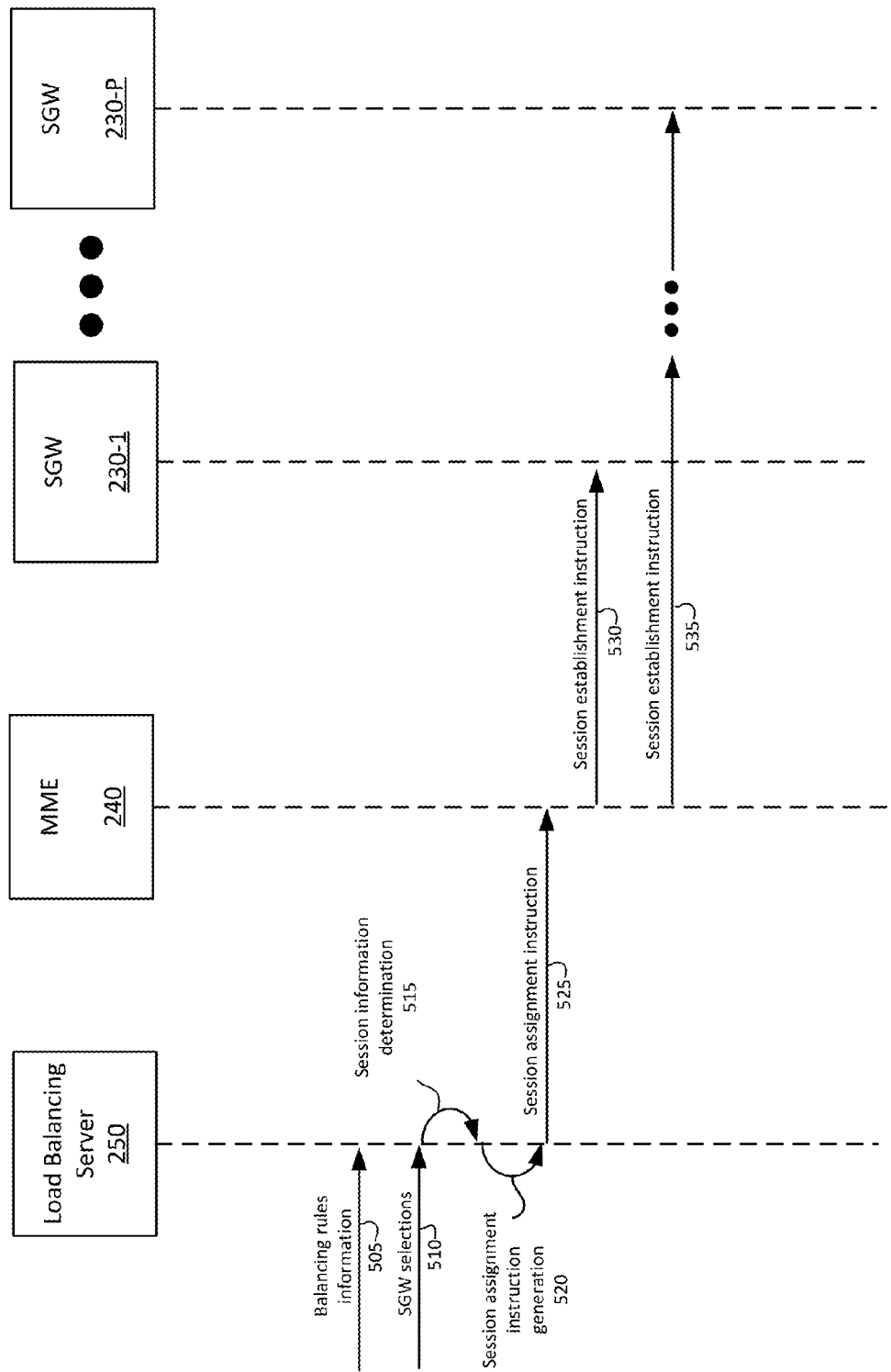
FIG. 5 illustrates a signal flow diagram illustrating example operations for balancing sessions across selected SGWs based on balancing rules.

FIG. 5 illustrates a signal flow diagram of example operations for balancing sessions across selected SGWs based on balancing rules. As shown in FIG. 5, load balancer server 260 may receive balancing rules information (at 505). For example, as described above, load balancer server 260 may receive balancing rules information from an operator via a user interface and/or automatically generated rules from a device that generates balancing rules. The balancing rules information may be stored in data structure 330 as described above. In some implementations, the balancing rules information may identify a load factor, a maximum number of sessions, and/or some other information that may be used to determine a manner in which sessions should be balanced across multiple SGWs 230. In some implementations, load balancer server 260 may receive multiple sets of balancing rules. Each set of balancing rules may apply to a particular SGW 230 or a particular group of multiple SGWs 230 having particular attributes.

As further shown in FIG. 5, load balancer server 260 may receive SGW selections (at 510). As described above, load balancer server 260 may receive selections for SGWs 230 among which sessions should be balanced. In some implementations, load balancer server 260 may receive the selections from an operator of load balancer server 260 via a user interface, and/or from a device that automatically selects SGWs 230, and/or determines how to balance sessions among a set of SGWs 230. In FIG. 5, assume that load balancer server 260 receives selections of SGW 230-1 through 230-P (where P is an integer greater than or equal to 1). In some implementations, load balancer server 260 may identify the sets of balancing rules for each of SGW 230-1 through SGW-P based on the attributes of each of SGW 230-1 through SGW-P.

Based on receiving the balancing rules information and the selection of SGWs 230, load balancer server 260 may determine real-time session information for the selected SGWs 230 (at 515). For example, as described above, load balancer server 260 may determine the real-time session information for the selected SGWs 230 by requesting the real-time session information from PGW 250 and/or another device (not shown). Based on requesting the real-time session information, the PGW 250 may provide the session information for the selected SGWs 230 to load balancer server 260. Additionally, or alternatively, PGW 250 and/or another device may actively provide session information (e.g., independent of a request from load balancer server 260), and load balancer server 260 may receive the session information for the selected SGWs 230. In some implementations, PGW 250 may provide a corresponding ID, a number of sessions between SGW 230 and PGW 250, and/or some other session-related information (e.g., bandwidth load, bit rates of data flows, etc.). In some implementations, load balancer server 260 may store the real-time session information for the selected SGWs 230 in a data structure, such as data structure 320.

Based on determining the session information, load balancer server 260 may generate a session assignment instruction (at 520). For example, load balancer server 260 may generate the session assignment instruction based on the sets of balancing rules for each of SGW-1 through SGW-P. Further, load balancer server 260 may generate the session assignment instruction based on the real-time session information. As described above, load balancer server 260 may determine a target number of sessions for each of the selected SGWs 230. The session assignment instruction may direct MME 240 to assign sessions to under-loaded SGWs 230 and to prevent the assignment of instructions to over-loaded SGWs 230 (e.g., as defined by the target number of sessions for each of the selected SGWs 230).

As further shown in FIG. 5, load balancer server 260 may provide the session assignment instruction to MME 240 (at 525). Based on receiving the session assignment instruction, MME 240 may provide session establishment instructions to SGWs 230-1 through 230-P (at 530 and 535). The session establishment instructions may correspond to the session assignment instructions, and may direct SGWs 230 having capacity to receive traffic to establish sessions with PGW 250.

Figure 6:
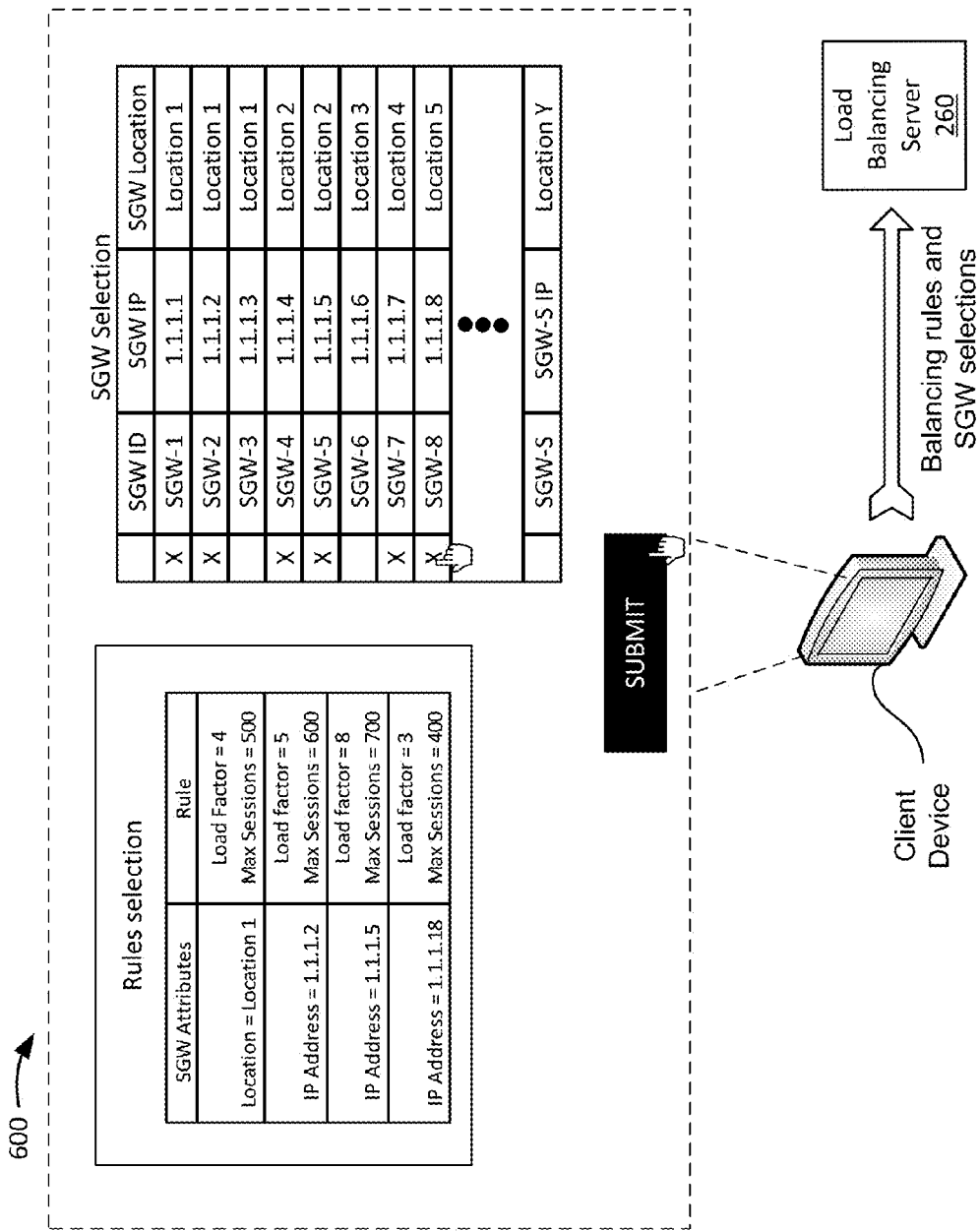
FIG. 6 illustrates an example implementation for selecting network devices and balancing instructions.

FIG. 6 illustrates an example user interface 600, which may allow for the selection of balancing rules and particular SGWs 230 across which to balance sessions. In FIG. 6, a client device may communicate with load balancer server 260 to receive information corresponding to a data structure, such as data structure 330. The client device may present the data structure in interface 600, as shown (e.g., to permit the selection of the particular SGWs 230 associated with load balancer server 260). As further shown in FIG. 6, user interface 600 may also permit an operator to define a set of balancing rules for SGWs 230 having a particular set of attributes. The client device may receive the selections and the balancing rules via user interface 600, and provide the selections and balancing rules to load balancer server 260. In the example shown in FIG. 6, the client device may receive selections for SGW-1, SGW-2, SGW-4, SGW-5, SGW-7, and SGW-8.

In some implementations, the client device may provide, via user interface 600, an error notification when the operator selects multiple balancing rules for a particular SGW 230 having an overlapping set of attributes. For example, assume that the operator selects a set of balancing rules for SGWs having a first set of attributes (e.g., the location of "Location 1"). Further, assume that the operator selects a second set of balancing rules for SGWs having a second set of attributes (e.g., the IP address of "1.1.1.1"). Further, assume that a particular SGW 230 is associated with Location 1 and with the IP address of 1.1.1.1. Given this assumption, the client device may provide, via user interface 600, an error notification indicating that a particular SGW 230 is associated with multiple different sets of balancing rules. In some implementations, the operator may select to allow multiple different sets of balancing rules to be stored for a particular SGW 230. When multiple different sets of balancing rules are stored for a particular SGW 230, load balancer server 260 may select a particular set of balancing rules using a priority value, a round-robin technique, a random selection technique, or some other technique.

While a particular example is shown in FIG. 6, it will be apparent that the above description is merely an example implementation. Other examples are possible and may differ from what was described with regard to FIG. 6. Also, interface 600 as shown in FIG. 6 is provided as merely an example. In practice, interface 600 may have a different format and/or appearance that what is shown in FIG. 6.

Figure 7:
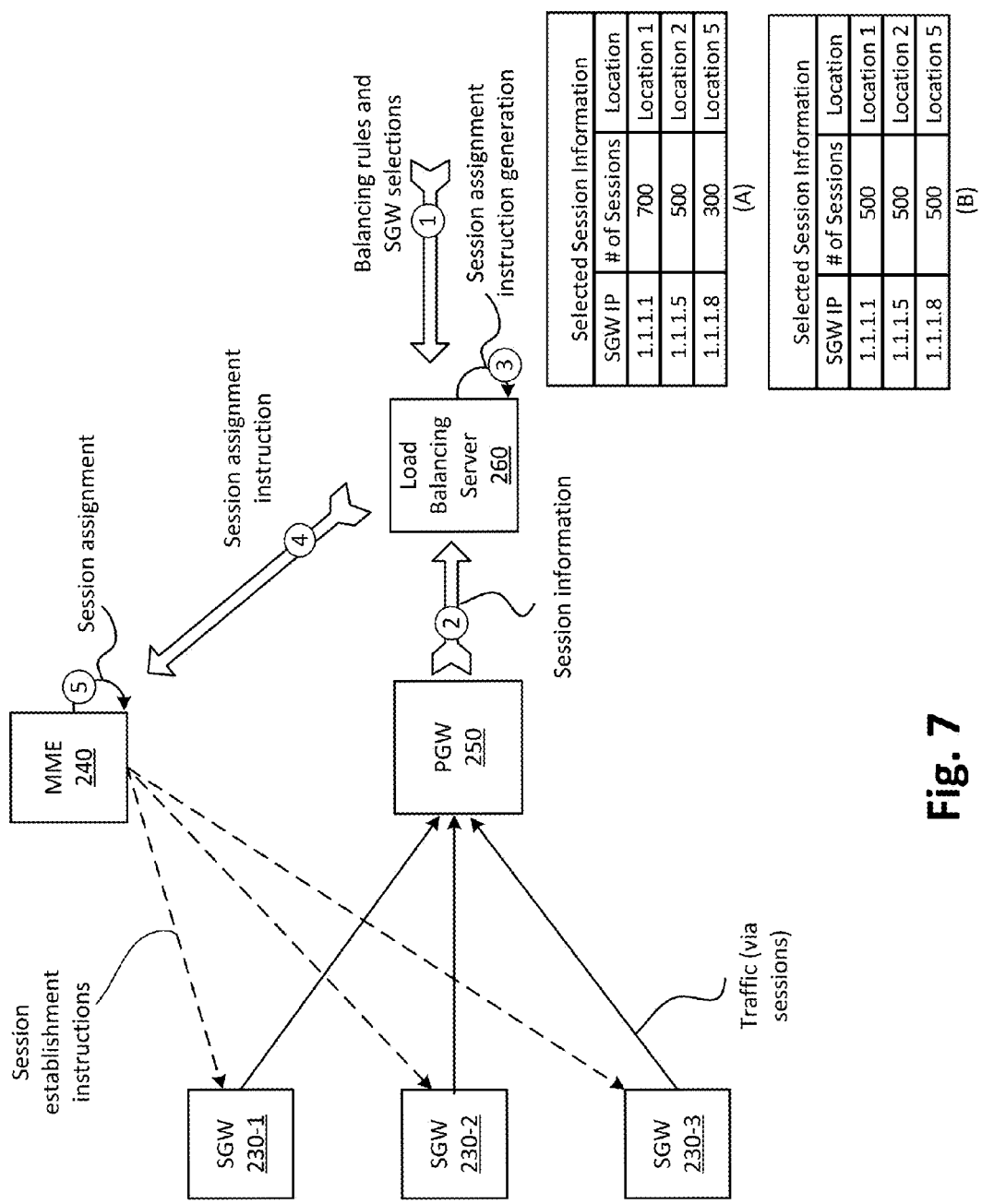
FIG. 7 illustrates an example implementation for assigning sessions to a set of SGWs.

FIG. 7 illustrates an example implementation for generating and executing a session assignment instruction. As shown in FIG. 7, load balancer server 260 may receive balancing rules and SGW selections (arrow 1). As described above, the balancing rules may identify load factors, maximum numbers of sessions, and/or some other balancing rule for one or more SGWs having particular attributes. The SGW selections may identify SGWs 230 whose sessions are to be balanced in accordance with the balancing rules. In FIG. 7, assume that the SGW selections identify SGWs 230-1, 230-2, and 230-3. Based on receiving the balancing rules and SGW selections, load balancer server 260 may receive session information, for SGWs 230-1, 230-2, and 230-3 from PGW 250 (arrow 2). Load balancer server 260 may then generate a session assignment instruction (arrow 3) based on the session information and the balancing rules. In some implementations, load balancer server 260 may generate a session assignment instruction based on a default set of balancing rules if balancing rules for a particular SGW 230 have not been received.

As further shown in FIG. 7, load balancer server 260 may provide the session assignment instruction to MME 240 (arrow 4). Based on receiving the session assignment instruction, MME 240 may assign sessions to SGWs 230-1 through 230-3 (arrow 5) by providing session establishment instructions to SGWs 230-1 through 230-3. The session establishment instructions may correspond to the session assignment instructions, and may direct SGWs 230 having capacity to process traffic to establish sessions with PGW 250.

Figure 8:
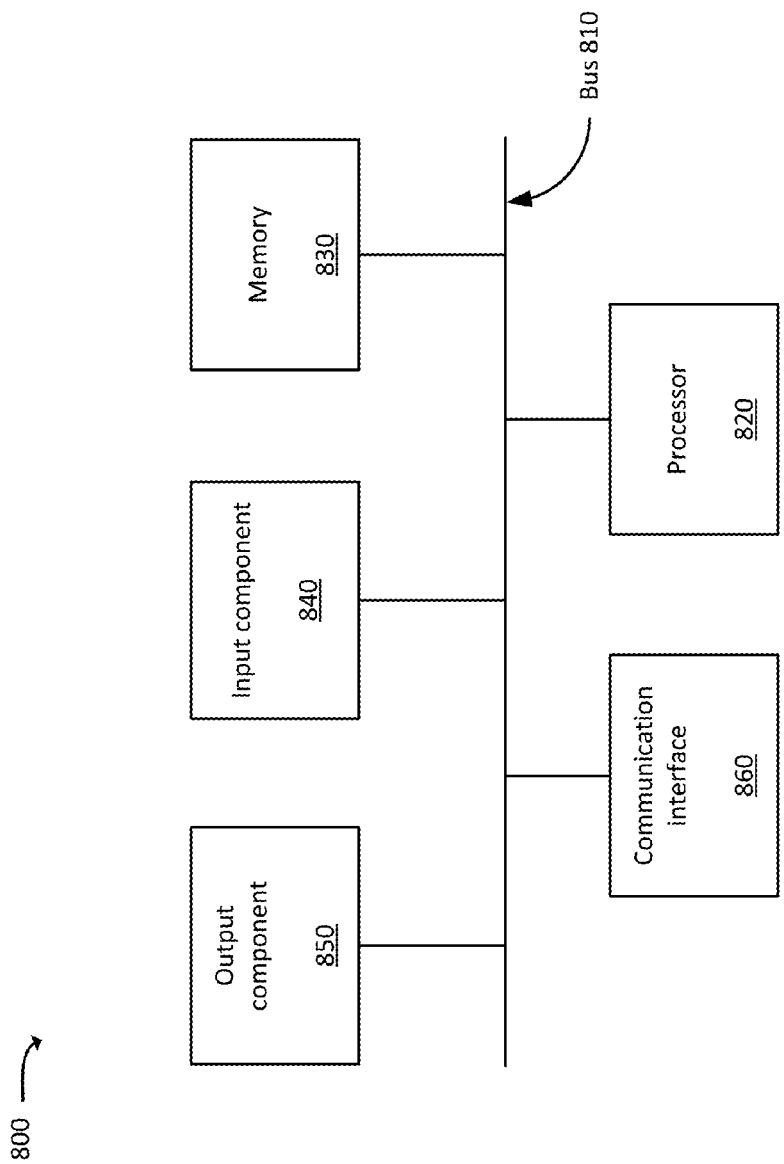
FIG. 8 illustrates example components of a device that may be used in some implementations described herein.

FIG. 8 is a diagram of example components of device 800. One or more of the devices described above (e.g., with respect to FIGS. 1, 2, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining, by a server device, session information that identifies a quantity of sessions established between each of a plurality of serving gateways (SGWs) and a particular packet data network (PDN) gateway (PGW); and
   directing, by the server device, a mobility management entity (MME) to assign additional sessions to one or more SGWs, of the plurality of SGWs,
      the additional sessions being between the one or more SGWs, of the plurality of SGWs, and the particular PGW based on the session information and corresponding sets of balancing rules associated with each of the one or more SGWs,
      the corresponding set of balancing rules, for a particular SGW, of the one or more SGWs, including at least one of:
         a load factor that identifies a percentage of an aggregate number of sessions to be assigned to the particular SGW, or
         information identifying a maximum number of sessions permitted to be assigned to the particular SGW.

2. The method of claim 1, wherein the corresponding sets of balancing rules are based on attributes of the one or more SGWs.

3. The method of claim 1, further comprising:
   determining a target quantity of sessions for each of the one or more SGWs,
   wherein directing the MME to assign the additional sessions is further based on the target quantity of sessions.

4. The method of claim 1, further comprising:
   receiving selections identifying the one or more SGWs,
   wherein determining the session information is based on receiving the selections.

5. The method of claim 1, wherein the additional sessions are first additional sessions, the method further comprising:
   receiving updated session information after directing the MME to assign the first additional sessions; and
   directing the MME to assign second additional sessions to the one or more SGWs based on the updated session assignment information.

6. The method of claim 1, further comprising:
   identifying, based on the session information, particular SGWs, of the one or more SGWs, having a quantity of established sessions that are below a particular threshold,
   wherein directing the MME to assign the additional sessions includes directing the MME to assign the additional sessions among the particular SGWs having the quantity of established sessions that are below the particular threshold.

7. The method of claim 1, further comprising:
   identifying, based on the session information, particular SGWs, of the one or more SGWs, having a quantity of established sessions that are above a particular threshold,
   wherein directing the MME to assign the additional sessions includes directing the MME refrain from assigning the additional sessions to the particular SGWs having the quantity of established sessions that are above the particular threshold.

8. The method of claim 1, wherein the session information further includes a measure of network load,
   wherein directing the MME to assign the additional sessions is further based on the measure of network load.

9. A system comprising:
   a server device, comprising: a non-transitory memory device storing a plurality of processor-executable instructions; and
   a processor configured to execute the processor-executable instructions, wherein executing the processor-executable instructions causes the processor to:
      determine session information that identifies a quantity of sessions established between each of a plurality of serving gateways (SGWs) and a particular packet data network (PDN) gateway (PGW); and
      direct a mobility management entity (MME) to assign additional sessions between the plurality of SGWs and the particular PGW based on the session information.

10. The system of claim 9, wherein executing the processor-executable instructions, to direct the MME to assign the additional sessions, further causes the processor to:
   direct the MME to assign the additional a sessions further based on corresponding sets of balancing rules associated with each of the plurality of SGWs, the corresponding set of balancing rules, for a particular SGW, of the plurality of SGWs, including at least one of:
      a load factor that identifies a percentage of an aggregate quantity of sessions to be assigned to the particular SGW, or
      information identifying a maximum quantity of sessions permitted to be assigned to the SGW.

11. The system of claim 9, wherein the corresponding sets of balancing rules are based on attributes of the plurality of SGWs.

12. The system of claim 9, wherein executing the processor-executable instructions further causes the processor to:
   determine a target quantity of sessions for each SGW, of the plurality of SGWs,
   wherein executing the processor-executable instructions, to direct the MME to assign the additional sessions, further causes the processor to direct the MME to assign the additional sessions further based on the target quantity of sessions.

13. The system of claim 9, wherein executing the processor-executable instructions further causes the processor to:
  receive selections identifying one or more SGWs, of the plurality of SGWs,
  wherein executing the processor-executable instructions, to determine the session information, further causes the processor to determine the session information based on receiving the selections.

14. The system of claim 9, wherein the additional sessions are first additional sessions, wherein executing the processor-executable instructions further causes the processor to:
  receive updated session information after directing the MME to assign the first additional sessions; and
  direct the MME to assign second additional sessions to the plurality of SGWs based on the updated session assignment information.

15. The system of claim 9, wherein executing the processor-executable instructions further causes the processor to:
  identify, based on the session information, particular SGWs, of the plurality of SGWs, having a quantity of established sessions that are below a particular threshold,
  wherein executing the processor-executable instructions, to direct the MME to assign the additional sessions, further causes the processor to direct the MME to assign the additional sessions among the particular SGWs having the quantity of established sessions that are below the particular threshold.

16. The system of claim 9, wherein executing the processor-executable instructions further causes the processor to:
  identify, based on the session information, particular SGWs, of the plurality of SGWs, having a quantity of established sessions that are above a particular threshold,
  wherein executing the processor-executable instructions, to direct the MME to assign the additional sessions, further causes the processor to direct the MME to refrain from assigning the additional sessions to the particular SGWs having the quantity of established sessions that are below the particular threshold.

17. The system of claim 9, wherein the session information further includes a measure of network load,
  wherein executing the processor-executable instructions, to direct the MME to assign the additional sessions, further causes the processor to direct the MME to assign the additional sessions further based on the measure of network load.

18. A non-transitory computer-readable medium storing a set of processor-executable instructions, which, when executed, cause one or more processors to:
  determine session information that identifies a quantity of sessions established between each of a plurality of serving gateways (SGWs) and a particular packet data network (PDN) gateway (PGW); and
  direct a mobility management entity (MME) to assign additional sessions between the plurality of SGWs and the particular PGW based on the session information.

19. The non-transitory computer-readable medium of claim 18, wherein the processor-executable instructions, to direct the MME to assign the additional sessions, further include processor-executable instructions to:
  direct the MME to assign the additional a sessions further based on corresponding sets of balancing rules associated with each of the plurality of SGWs, the corresponding set of balancing rules, for a particular SGW, of the plurality of SGWs, including at least one of:
    a load factor that identifies a percentage of an aggregate quantity of sessions to be assigned to the particular SGW, or
    information identifying a maximum quantity of sessions permitted to be assigned to the SGW.

20. The non-transitory computer-readable medium of claim 18, wherein the corresponding sets of balancing rules are based on attributes of the plurality of SGWs.

* * * * *